United States Patent [19]

Frank et al.

[11] 4,190,336
[45] Feb. 26, 1980

[54] PIEZOELECTRIC POWER SUPPLY FOR CAMERAS

[75] Inventors: Lee F. Frank; James K. Lee, both of Rochester, N.Y.

[73] Assignee: Eastman Kodak Company, Rochester, N.Y.

[21] Appl. No.: 820,488

[22] Filed: Jul. 29, 1977

[51] Int. Cl.² .............................. G03B 7/08; H01V 41/10
[52] U.S. Cl. ........................................ 354/50; 354/226; 310/332; 310/339
[58] Field of Search .................. 354/26, 29, 30, 36, 354/38, 48, 50, 51, 60 A, 60 R, 135, 142, 256, 258, 266, 267, 234, 226; 310/330, 331, 332, 339, 319; 350/269

[56] References Cited

U.S. PATENT DOCUMENTS

| 3,456,134 | 7/1969 | Ko ..................................... 310/319 X |
| 3,500,451 | 3/1970 | Yando ............................... 354/135 X |
| 3,553,588 | 1/1971 | Honig ................................. 310/339 X |
| 3,636,840 | 1/1972 | Harvey et al. ......................... 354/29 |

FOREIGN PATENT DOCUMENTS 709977 5/1965 Canada .

*Primary Examiner*—L. T. Hix
*Assistant Examiner*—William B. Perkey
*Attorney, Agent, or Firm*—Warren W. Kurz

[57] ABSTRACT

A shutter control device is disclosed which includes a shutter which is openable to permit scene light to pass through a camera aperture, an electronic circuit for controlling the shutter to automatically establish exposure duration in accordance with the level of scene illumination, piezoelectric means such as a bimorph for providing electrical power to the circuit when stressed, and means for repeatedly stressing the piezoelectric means during each exposure cycle.

3 Claims, 4 Drawing Figures

PIEZOELECTRIC POWER SUPPLY FOR CAMERAS

CROSS-REFERENCE TO RELATED APPLICATIONS

Reference is made to commonly assigned, co-pending U.S. patent application Ser. No. 816,776, entitled PIEZOELECTRIC CAMERA SHUTTER, filed in the names of L. F. Frank and J. K. Lee on July 18, 1977.

BACKGROUND OF THE INVENTION

1. Field of the Invention

The present invention relates to exposure control devices for use in photographic apparatus, such as still cameras and the like, and more particularly to shutter control devices for automatically establishing exposure time in accordance with the level of scene illumination.

2. Description of the Prior Art

In many prior art shutter control devices which include timing circuits for establishing shutter speed, the circuit is energized by a battery contained in the camera. Such mechanisms usually include an electromagnetic transducer adapted to close the shutter after a period of time determined by the timing circuit. Although such arrangements are generally satisfactory, they rely on the availability of sufficient power from the battery. When the battery power is inadequate for operation of such systems, either the shutter operates at a fixed, predetermined speed or it remains open indefinitely, depending on the type of shutter control.

In commonly assigned, co-pending U.S. patent application Ser. No. 816,776, entitled PIEZOELECTRIC CAMERA SHUTTER, filed in the names of L. F. Frank and J. K. Lee on July 18, 1977, a shutter control device was disclosed which employed a piezoelectric bimorph for providing electrical energy for powering an electronic exposure control circuit. The shutter control device disclosed in that application represented a significant improvement over previously known mechanisms because piezoelectric devices are more reliable than battery sources and more efficient than conventional, non-battery powered sources known in the prior art for powering camera exposure control systems. In fact, piezoelectric devices have very little resistive loss, and may operate at electro-mechanical conversion efficiencies as high as about 50%.

However, although piezoelectric bimorph devices are efficient generators, the amount of charge which can be generated with each flexure is predetermined for each device, and there are situations wherein the amount of charge would be insufficient to power a camera's automatic exposure control device. By the present invention, a piezoelectric generator is adapted to supply a greater amount of charge by being repeatedly stressed than would be possible by a single stressing of the generator.

SUMMARY OF THE INVENTION

In accordance with the present invention, there is provided an openable shutter, the speed of which is controlled by an electronic circuit which produces a signal having a characteristic which is a function of scene illumination. Electrical energy for powering the electronic circuit is derived from a piezoelectric device associated with means for repeatedly stressing the device during each exposure cycle to place a charge thereover with each stressing cycle. The charge over the device is applied to the electronic circuit with each stressing cycle is thereby build up to a suitable voltage for operating the electronic circuit.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings in which.

DESCRIPTION OF THE PREFERRED EMBODIMENTS

Piezoelectricity is a well known phenomenon exhibited by certain crystals. In brief, when such crystals are compressed or extended in particular directions, electric charges of opposite signs are produced at opposite ends of the crystal. Not only is an electric moment induced in piezoelectric crystals by an application of mechanical stress or strain, there is also a converse effect; namely, on applying an electric field, the crystal changes shape by expansion in one direction and contraction in another. A fuller discussion of the direct and converse effects may be found in ENCYCLOPAEDIC DICTIONARY OF PHYSICS, Pergamon Press, 1962, pages 503-505.

A bimorph, or bimorph cell, is a member composed of two strips of piezoelectric material joined together (such as by cement) with the direction of expansion of one strip aligned with the direction of contraction of the other such that the application of an electric potential to both strips caused one to expand and the other to contract, thus producing a bending of the combination in a manner analogous to the curling of a bimetallic strip due to differential expansion when heat is applied. Until the potential difference is removed, the bimorph will remain bent. If a bimorph is physically bent, an electric potential difference tending to return the bimorph to its original configuration will develop from one strip to that of the other strip. That potential difference will remain until either the potential is externally removed or the bimorph is unflexed. If the bimorph is bent and the originally created potential difference dissipated, such as by shorting or through a load, the unbending of the bimorph by external force or its own internal spring force will produce an electric potential of a polarity opposite to that of the original potential produced when the bimorph was first bent. This potential will resist the forces (e.g., internal spring force) tending to return the bimorph to its original configuration.

The drawings illustrate the operating principal of cameras incorporating preferred embodiments of the present invention. Because cameras are well known, the present description will be directed in particular to elements forming part of, or cooperating more directly with, the present invention. Camera elements not specifically shown or described may take various forms well known to those skilled in the art.

Figure 1A:
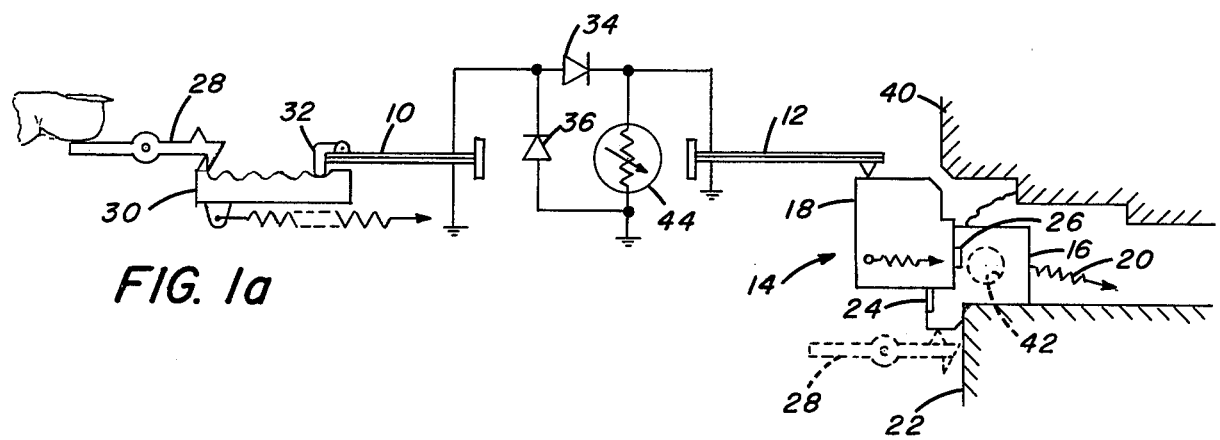
FIGS. 1a, 1b and 1c are schematic views of a portion of a camera in accordance with a preferred embodiment of the present invention.
Figure 1B:
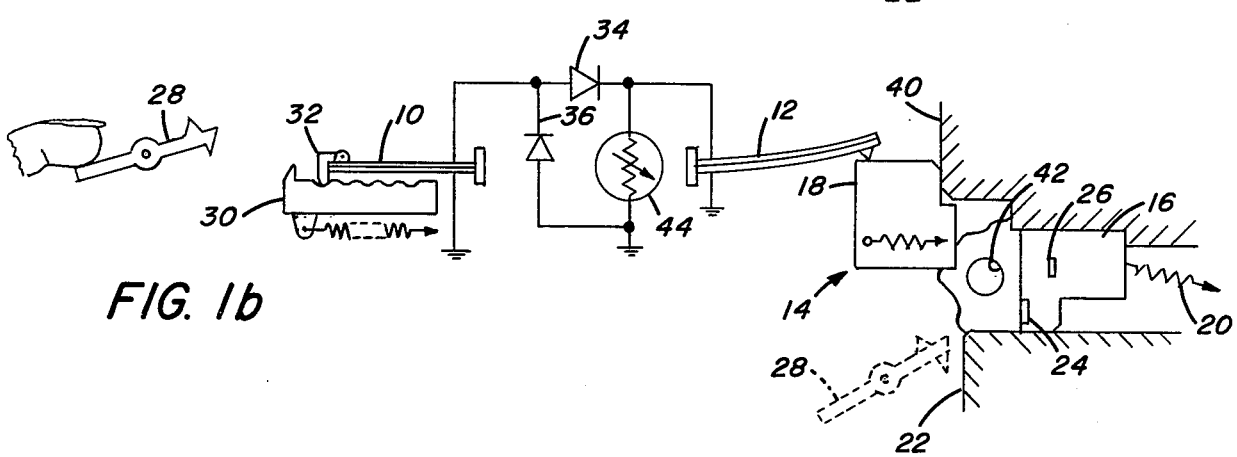
Figure 1C:
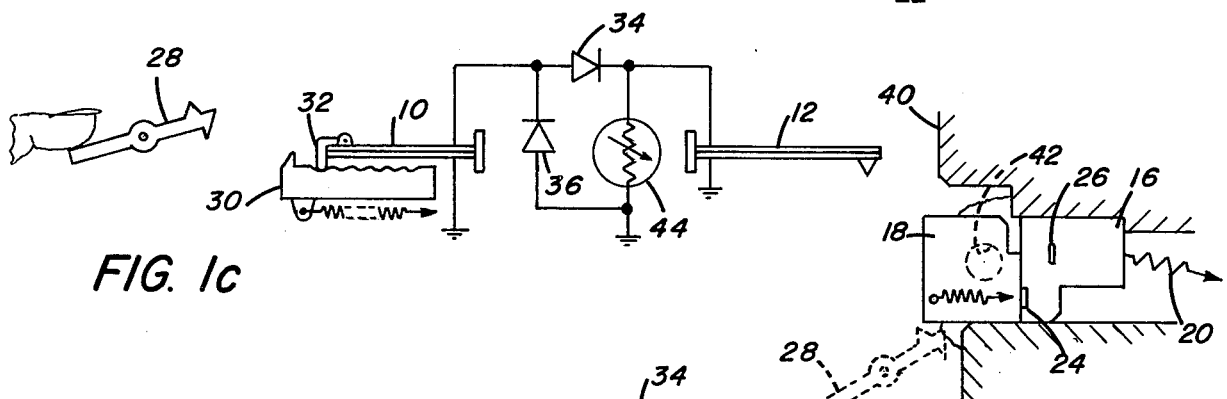

The embodiment of the present invention schematically shown in FIGS. 1a, 1b and 1c includes a bimorph generator 10 and a bimorph motor 12 each fixed at one end to the camera housing and adapted for use with a shutter mechanism, such as, for example, a focal plane shutter 14. The shutter mechanism 14 includes an opening blade 16 and a closing blade 18. When the shutter is in its cocked, FIG. 1a position, blade 16 is latched against the horizontal component of force of a spring 20 by a stop 22, and is held downward, to remain latched, by the vertical force component of spring 20. Closing blade 18 is held down by bimorph motor 12 and is held to the left by engagement with tab 26, also on opening blade 16.

Bimorph generator 10 is cantilevered above a cam bar 30 for actuation as will be described hereinafter. Generator 10 is electrically connected to motor bimorph 12 through a circuit which includes a pair of diodes 34 and 36 and a photoresponsive element 44. Diode 34 serves to transfer positive charge from bimorph 10 to bimorph 12 when the free end of bimorph 10 is bent upwardly, but to block the return flow of that charge from bimorph 12. Diode 36 allows charge of opposite polarity, as is produced when bimorph 10 bends downwardly under its own restoring force, to be discharged to ground. Positive charge created on bimorph 10 when it is flexed upwardly cannot flow through diode 36. Photoresponsive element 44 provides a timing function, as explained below.

To initiate exposure, the operator rotates latch member 28 to the position shown in FIG. 1b. This movement pushes shutter blades 16 and 18 upwardly, first latching closing blade 18 behind wall 40 and then allowing opening blade 16 to clear stop 22 and be moved to the right. This uncovers aperture 42 to initiate exposure. The movement of blade 18 to its FIG. 1b position flexes motor bimorph 12 as shown. This creates an initial charge thereacross with a sign tending to unbend the bimorph, but that charge forward biases diodes 34 and 36 and is thereby shorted to ground.

Rotation of latch member 28 also releases spring-biased cam bar 30 for movement from its FIG. 1a position toward its FIG. 1b position as shown at the left side of the figures. As bar 30 moves, a follower 32 on bimorph generator 10 follows the cam surface up the first lobe. This flexes the generator to generate an electric charge. Half of that charge is transferred through diode 34 and is of a sign which causes an electromotive force in motor bimorph 12 which opposes the internal spring force tending to unbend the motor bimorph.

When the follower is at the top of the first lobe, only half the positive charge built up by generator bimorph 10 remains on that bimorph, the other half being transferred to motor bimorph 12 through diode 34. Now, as follower 32 slides down the cam towards a cam null, that half of the total charge stored on bimorph 10 will begin to dissipate as the bimorph unflexes. At some point before the bimorph generator has reached its unstressed condition, there will be no difference between the potential of its two strips. After that point has been reached, and as the bimorph continues to unflex, charge of opposite polarity will tend to develop across bimorph 10, which charge will be shorted to ground through diode 36 until bimorph 10 is relaxed and follower 32 is at the cam null.

As the follower begins riding up the second lobe, positive charge will again begin building across generator bimorph 10, but will not be transferred through diode 34 to motor bimorph 12 until the positive charge on the generator bimorph has reached, and begins to exceed, the level of charge on the motor bimorph. Because of this, only half the amount of charge will be transferred to the motor bimorph by the second generator flexure as transferred by the first flexure. In similar manner, each successive cam lobe encountered by follower 32 will cause only half the charge to be transferred through diode 34 as was transferred by the preceding lobe. Thus, positive charge will be applied to motor bimorph 12 in repeated steps, each step being half as large as the preceding step. In a very short time relative to the reaction time to release finger pressure on latch member 28, sufficient charge will have been transferred to the motor bimorph to have set up an electromotive force balancing the internal spring force tending to unflex it from its FIG. 1b configuration.

The reader should note that the drawings are not to be considered as being drawn to scale. In fact, while the free end of the generator bimorph may move through a peak-to-peak amplitude of, say, one-tenth inch, a total movement of the free end of motor bimorph 12 of a few thousandths of an inch may be sufficient to operate the shutter mechanism according to the following description. Certain features of the drawings have been shown greatly enlarged for clarity of understanding, and latch member 28 has been schematically shown in two places, at the left and right sides of the figures.

As long as substantial charge remains stored on bimorph motor 12, closing blade 18 will be held by wall 40 and aperture 42 will remain open. However, charge on bimorph 12 will begin to decay through a photoresponsive element such as for example a CdS cell 44 at a rate proportional to the intensity of light impinging upon the cell. As the voltage difference between the strips of motor bimorph 12 decreases, the electromotive force holding it flexed also decreases, and the bimorph's internal spring force begins to straighten the bimorph. When sufficient charge leakage has occurred to straighten bimorph motor 12 to an extent sufficient to push closing shutter blade 18 clear of wall 40, the blade will snap to its FIG. 1c position, terminating exposure. The shutter blades may be returned to their cocked, FIG. 1, positions by suitable means such as that shown in U.S. Pat. No. 3,205,799, which issued Sept. 14, 1965 to J. P. Burgarella et al. Similarly cam slide is moved to its FIG. 1a position in preparation for another exposure. As it travels to the left, follower 32 ratchets over the lobes of slide 30 so as not to bend bimorph generator 10.

Figure 2:
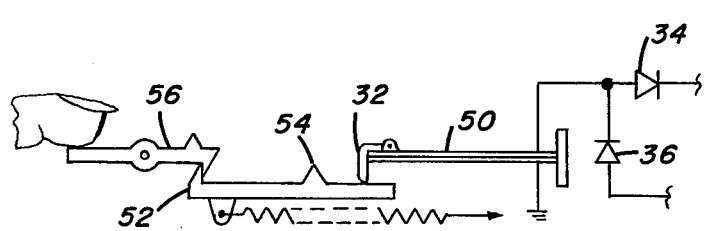
FIG. 2 is a schematic view of a portion of a camera in accordance with a second preferred embodiment of the present invention.

FIG. 2 shows an alternative bimorph generator 50 and cam bar 52 which may be used for generator 10 and cam bar 30 of FIGS. 1a, 1b and 1c. Cam bar 52 carries a single lobe 54 which, upon release of latch 56 (same as the preceding embodiment), strikes follower 60 with sufficient energy to cause the free end of bimorph generator 50 to begin oscillating in a damped sinusodial manner.

As in the FIG. 1 embodiment, upward flexure of the generator will charge the motor bimorph, not shown, while downward flexure will draw charge from ground. If the energy from the bimorph generator is efficiently coupled electrically to the bimorph motor, a single actuation is capable of supplying sufficient energy to the motor bimorph to actuate the shutter mechanism described with respect to the FIG. 1 embodiment.

Although the latches which constrain shutter blades 16 and 18 in FIGS. 1a, 1b and 1c (and also FIG. 2) may take any of several forms well known in the art, we have found it desirable to chamfer the interface between the blades and their respective stops 22 and 40 by an angle slightly greater than the angle of repose between the material used in the blades and the stops. The angle of repose, also known as the limiting angle for static friction, is that angle of chamfer at which the force applied to the shutter blades will just cause the blades to begin to slide on the stops.

The invention has been described in detail with particular reference to preferred embodiments thereof, but it will be understood that variations and modifications can be effected within the spirit and scope of the invention.

We claim:

1. In photographic apparatus having (1) an aperture, (2) shutter means for selectively opening and closing the aperture to provide an exposure period, and (3) electrically energizable photoelectric means, including a piezoelectric charge storage device, for controlling the shutter means to vary the exposure period in accordance with scene luminance, the improvement comprising:
   (a) charge generating means including a flexible piezoelectric member which is adapted to generate and store charge of one polarity upon being flexed toward a predetermined flexed configuration, and to generate and store charge of opposite polarity upon unflexing from said flexed configuration toward a relaxed configuration;
   (b) actuating means for repeatedly flexing said member toward said flexed configuration and for allowing said member, between successive flexures, to unflex from said flexed configuration toward said relaxed configuration;
   (c) means electrically connecting said piezoelectric member and said charge storage device for transferring charge of said one polarity to said storage device when said member is flexed toward said flexed configuration;
   (d) means for preventing transfer of charge of said one polarity from said charge storage device to said piezoelectric member when said member unflexes from said flexed configuration toward said relaxed configuration; and
   (e) means for discharging charge of said opposite polarity from said piezoelectric member when said member unflexes from said flexed configuration toward said relaxed configuration.

2. The invention as defined in claim 1 wherein said photoelectric means further comprises a photocell, operatively coupled to said piezoelectric charge storage device and to ground, for dissipating charge from said piezoelectric charge storage device at a rate proportional to scene luminance.

3. The invention as defined in claim 2 wherein said piezoelectric charge storage device is adapted to change shape as charge is dissipated therefrom, and wherein said change in shape is effective to control said shutter means to terminate said exposure.

* * * * *